(12) United States Patent
Kalagnanm et al.

(10) Patent No.: US 7,774,226 B2
(45) Date of Patent: Aug. 10, 2010

(54) ACCEPTING BIDS UNDER UNCERTAIN FUTURE DEMANDS

(75) Inventors: Jayant R. Kalagnanm, Tarrytown, NY (US); Monalisa Mohanty, Poughkeepsie, NY (US); Gyana Ranjan Parija, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1541 days.

(21) Appl. No.: 10/664,842

(22) Filed: Sep. 18, 2003

(65) Prior Publication Data

US 2005/0065838 A1 Mar. 24, 2005

(51) Int. Cl.
*G06F 9/44* (2006.01)
(52) U.S. Cl. .................. 705/10; 705/7; 705/8
(58) Field of Classification Search ............ 705/10, 705/7, 8
See application file for complete search history.

(56) References Cited

U.S. PATENT DOCUMENTS

2002/0065750 A1* 5/2002 Tanaka .................. 705/28
2002/0143665 A1* 10/2002 Santos et al. ............ 705/28
2003/0167146 A1* 9/2003 Tezuka et al. ............ 702/129

OTHER PUBLICATIONS

Bichler, M. et al. "Applications of flexible pricing in business-to-business electronic commerce", IBM Systems Journal, vol. 41, No. 2, 2002.*
Ahmed, S. et al. "A Multi-Stage Stochastic Integer Programming Approach for Capacity Expansion under Uncertainty", Journal of Global Optimization, vol. 26, pp. 3-24, May 2003.*

* cited by examiner

*Primary Examiner*—Beth V. Boswell
*Assistant Examiner*—Mark A Fleischer (57) ABSTRACT

The present invention provides a method and apparatus for developing an optimal sales plan for multiple products with multiple price classes contingent on different possible realizations of uncertain demand over multiple time periods with the objective of maximizing expected revenue over a constrained capacity. The present invention formulates a multi-stage stochastic program that generates a quantity of each of the multiple products to be sold in each of the multiple time periods and a recommendation for when realized demand for at least one of the multiple time periods exceeds a planned sales volume; estimates a likelihood that the realized demand for the at least one of the multiple time periods exceeds the planned sales volume; and collects realized order data for each of the multiple time periods; and executes the multistage stochastic program using the likelihood and the realized order data to generate a sales plan.

18 Claims, 6 Drawing Sheets

ACCEPTING BIDS UNDER UNCERTAIN FUTURE DEMANDS

BACKGROUND OF THE INVENTION

1. Field of the Invention

The present invention relates to sales plans, and, more particularly, to strategic and tactical sales plans for multiple products offerings with differing price classes contingent on different possible realizations of uncertain demands.

2. Description of the Related Art

Consider the following pricing problem arising in the marketplace. The seller has multiple product offerings belonging to two or more price classes (e.g., First, Business, and Economy fare classes for an airline company) to sell in a marketplace where the demand for each product in each prices class in each time period is uncertain. Every product is manufactured only after a bid for the product is accepted by the seller (e.g., assembling components to build a personal computer). The products require multiple resources (e.g., hard disks, memory modules, etc.) which are constrained for the planning time horizon. There may be a minimum requirement (dictated, for example, by possible Service Level Agreements) on meeting a pre-specified portion of the actual demand for each time period.

In such a situation, the seller is challenged with the tactical decision of whether to accept a bid in a current time period, with the overall objective of the seller being maximization of revenue over the planning horizon. While accepting the bid now might jeopardize the seller's chances of meeting unknown future demands, rejecting the bid may mean leaving money on the table. Thus, it is imperative that the seller must hedge against all future uncertainties to arrive at an optimal bid acceptance decision for the current time period.

A classical application for such an approach is in the PC industry where the time to assemble a PC is relatively short compared to the long lead-times for supplies of PC components. A common scenario that is encountered in the PC industry is that a bulk of the orders (for any quarter, for example) are realized in the last two to three weeks of the quarter. Because the lead time for at least some of the components in the bill-of-materials for a PC may be well over three weeks, it follows that the company has to operate in the last few (and possibly most critical) weeks in accordance with an inventory constrained sales plan. Because well over 50% of a company's revenue may be materialized in this operating mode, optimizing revenue for this setting could be critical for a company.

Revenue management is now practiced routinely in industries with perishable inventory such as airlines, car rentals, hotels, etc. However, current inventory allocation techniques are static and do not consider demand uncertainties explicitly in a sales plan. As a result, the current inventory allocation techniques do not provide a recourse action if the demand realizations are significantly different from the forecast. This could result in a significant detriment on the expected revenue.

Therefore, a need exists for a system and method that develops strategic and tactical sales plans for multiple products offerings with differing price classes contingent on different possible realizations of uncertain demand. The system and method should allocate constrained inventory across different price classes and explicitly consider uncertainty in the demand.

SUMMARY OF THE INVENTION

In one aspect of the present invention, a method is provided for developing an optimal sales plan for multiple products with multiple price classes contingent on different possible realizations of uncertain demand over multiple time periods with the objective of maximizing expected revenue over a constrained capacity. The method comprises formulating a multistage stochastic program that generates a quantity of each of the multiple products to be sold in each of the multiple time periods and a recommendation for when realized demand for at least one of the multiple time periods exceeds a planned sales volume; estimating a likelihood that the realized demand for the at least one of the multiple time periods exceeds the planned sales volume; collecting realized order data for each of the multiple time periods; and executing the multistage stochastic program using the likelihood and the realized order data to generate a sales plan.

In another aspect of the present invention, an apparatus is provided for developing an optimal sales plan for multiple products with multiple price classes contingent on different possible realizations of uncertain demand over multiple time periods with the objective of maximizing expected revenue over a constrained capacity. The apparatus comprises a stochastic programming engine for formulating and executing a multistage stochastic program that generates (i) a strategic decision model for prescribing a quantity of each product to be sold in each of the multiple time periods, and (ii) a tactical decision model for generating recommendation for when realized demand for at least one of the multiple time periods exceeds a planned sales volume; and a trigger engine for estimating a likelihood that the realized demand for at least one of the multiple time periods exceeds the planned sales volume.

In yet another aspect of the present invention, a system is provided for developing an optimal sales plan for multiple products with multiple price classes contingent on different possible realizations of uncertain demand over multiple time periods with the objective of maximizing expected revenue over a constrained capacity. The system comprises means for formulating a multistage program that generates a quantity of each of the multiple products to be sold in each of the multiple time periods and a recommendation for when realized demand for at least one of the multiple time periods exceeds a planned sales volume; means for estimating a likelihood that the realized demand for the at least one of the multiple time periods exceeds the planned sales volume; means for collecting realized order data for each of the multiple time periods; and means for executing the multistage program using the likelihood and the realized order data to generate a sales plan.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

The present invention provides a multistage stochastic programming approach to model and solve the pricing problem described above. At a strategic level, the approach prescribes the quantity of each product to sell in each time period. At a tactical level, the approach recommends to the seller whether to accept an order when the demand in the current time period exceeds the planned sales volume. Orders may be acquired by any of a variety of channels, as is contemplated by those skilled in the art. For example, orders may be acquired directly from consumers (e.g., through a manufacturer's website), indirectly from consumers (e.g., through a point-of-sale terminal at a retail store), or from another business (e.g., through a reverse auction). In a typical reverse auction, a buying company publicizes an item(s) they would like to buy and selling companies compete (e.g., bid) for the best price they are willing to take for the item(s). Once the buying chooses a selling company, the selling company is generally obligated to sell the item(s) to the buying company. It is understood that the present invention encompasses any of a variety of reverse auction types, as known to those skilled in the art. For example, the reverse auction may be done using a sealed bid or an open bid.

A multi-period scenario tree is constructed to capture the evolution of the product demand quantities and exploit the scenario tree in a linear programming framework to develop a robust (with regard to future demand uncertainties) as well as flexible (with regard to bid acceptance recourse decisions at the tactical level) sales plan. To react dynamically to evolving demand conditions, a trigger engine is provided. The trigger engine senses the demand scenario that is being realized in a given time period. It provides an indication of when a seller may need to reoptimize the sales plan based on current realization.

The present invention provides a novel method for allocating constrained inventory across different price classes with the following novelties. Firstly, the inventory is not perishable and unused inventory from one period can be used in the next period. As a result, the demand forecasts are for each price class for each period. Secondly, uncertainty in the demand is considered explicitly in terms of scenarios and the sales plan is a contingent plan that provides different alternatives depending on the demand realizations for any given period. This is achieved by formulating the allocation problem as a stochastic programming problem with a demand scenario tree. Thirdly, within each period a trigger engine is provided that forecasts if the demand for any price class is significantly different from the allocation. Results from the trigger engine can be used to determine whether to reoptimize the sales plan.

It is noted that the term "constrained," as used in the present invention, refers to a limited amount. The term "constrained capacity" refers to a limited capacity holding the inventory to be sold. For example, if an airplane holds only 100 seats, then only 100 seats (i.e., the constrained capacity) can be sold to consumers by an airline.

It is noted that the term "planned sales volume" refers to an optimized determination (determined, for example, by solving a stochastic program, as described in greater detail below) of the quantity of each product to be sold for each time period. The planned sales volume, may be constructed to fulfill any of a variety of criteria known to those skilled in the art. For example, the planned sales volume may be constructed to maximize revenue and profit. Naturally, the planned sales volume may be limited by the constrained capacity (e.g., an airline cannot sell 200 seats given a 100-seat constrained capacity).

It is noted that the term "realization of uncertain demand," as used in the present invention, refers to the actual demand experienced in a real-world setting. For example, uncertain demand for a computer may be realized by the number of orders collected for the computer from a point-of-sale terminal at a retail store. It follows that the uncertain demand for a particular time period cannot be realized until the time period is over (i.e., all of the order and/or sales data has been collected for the entire time period).

It is noted that the term "multistage" refers to multiple recourse decision points over a planning horizon. Hence, a "multistage stochastic program" is capable of solving one or more recourse decision points over a planning horizon.

Recourse decisions are decisions made in response to the realization of uncertain demand over one or more time periods. For example, a recourse decision may be made to redetermine a demand forecast over a 3 month planning horizon if the demand during the first month is below or above the demand forecast. The frequency of the recourse decisions may vary depending on implementation, as is contemplated by those skilled in the art.

Figure 1:
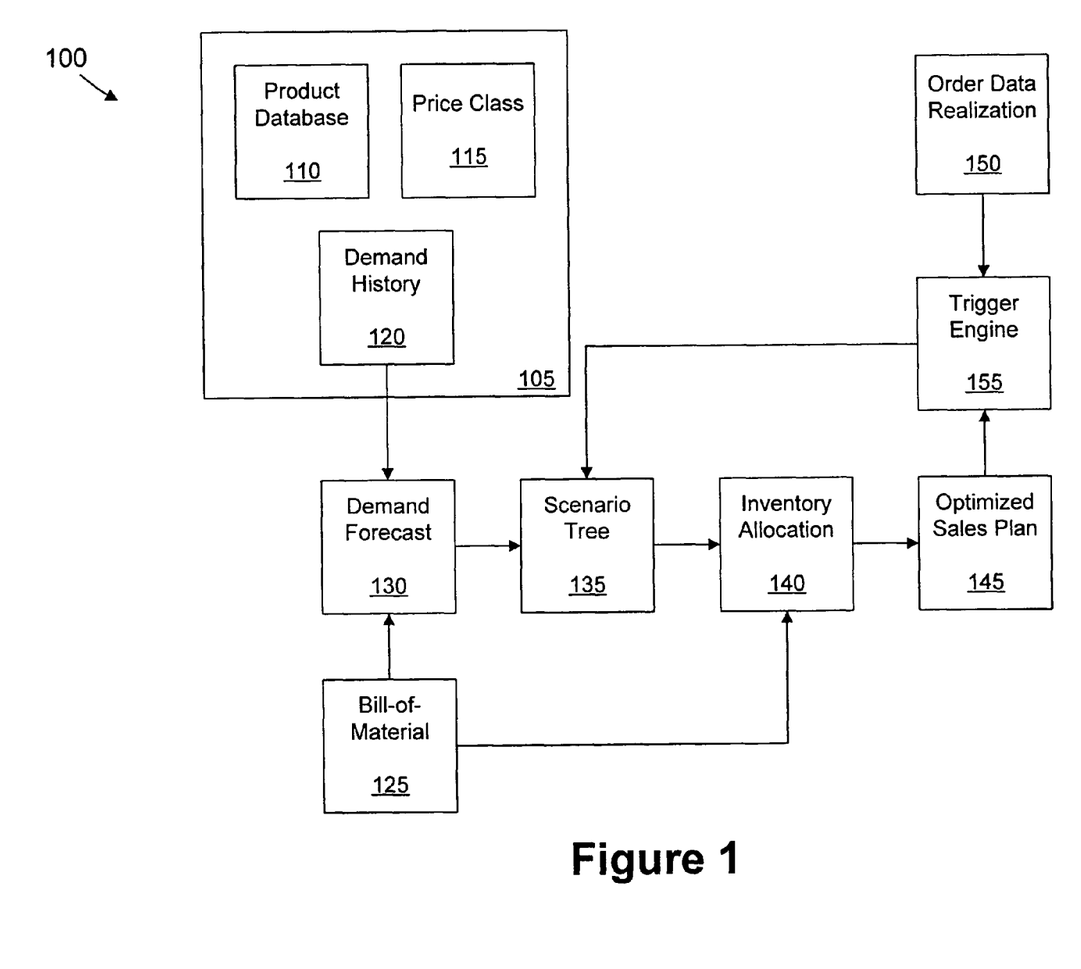
FIG. 1 is a simplified block diagram of a sales planning system, in accordance with one illustrative embodiment of the present invention.

Referring now to FIG. 1, an overview of a sales planning system 100, in accordance with one embodiment of the present invention, is provided. A sales planning database 105 is shown. The sales planning database 105 comprises three components: a product database 110, a price class database 115, and a demand history database 120. It is understood that the product database 110, the price class database 115, and the demand history database 120 may be implemented as separate databases or may be combined to form at least part of a larger database, as illustrated in FIG. 1. The product database 110 stores a list of products being sold. A price class database 115 stores the different prices classes associated with each product in the product database 110. For example, the same bottle of water sold for a price x at a supermarket may be sold for 3x at a movie theater. The price at the supermarket and at the movie theater represent two price classes. The demand history database 120 captures the historical demand for each price class by product.

A bill-of-material structure table 125 provides a table of the requisite resources to produce each product. For example, a bill-of-material structure table 125 for a computer may include a processor, a hard drive, a RAM, and the like. The demand history database 120 is combined with the bill-of-material structure table 125 to generate a demand forecast 130 for each price class for a given product. The demand forecast 130 provides a projection of the quantity of products that will be sold during some future time period. The demand forecast 130 also determines the quantity of resources necessary to meet the projection. It is understood that the demand forecast 130 may be projected for one or more time periods for some total time interval, for example, weekly time periods over the quarterly intervals (i.e., three months).

Figure 2:
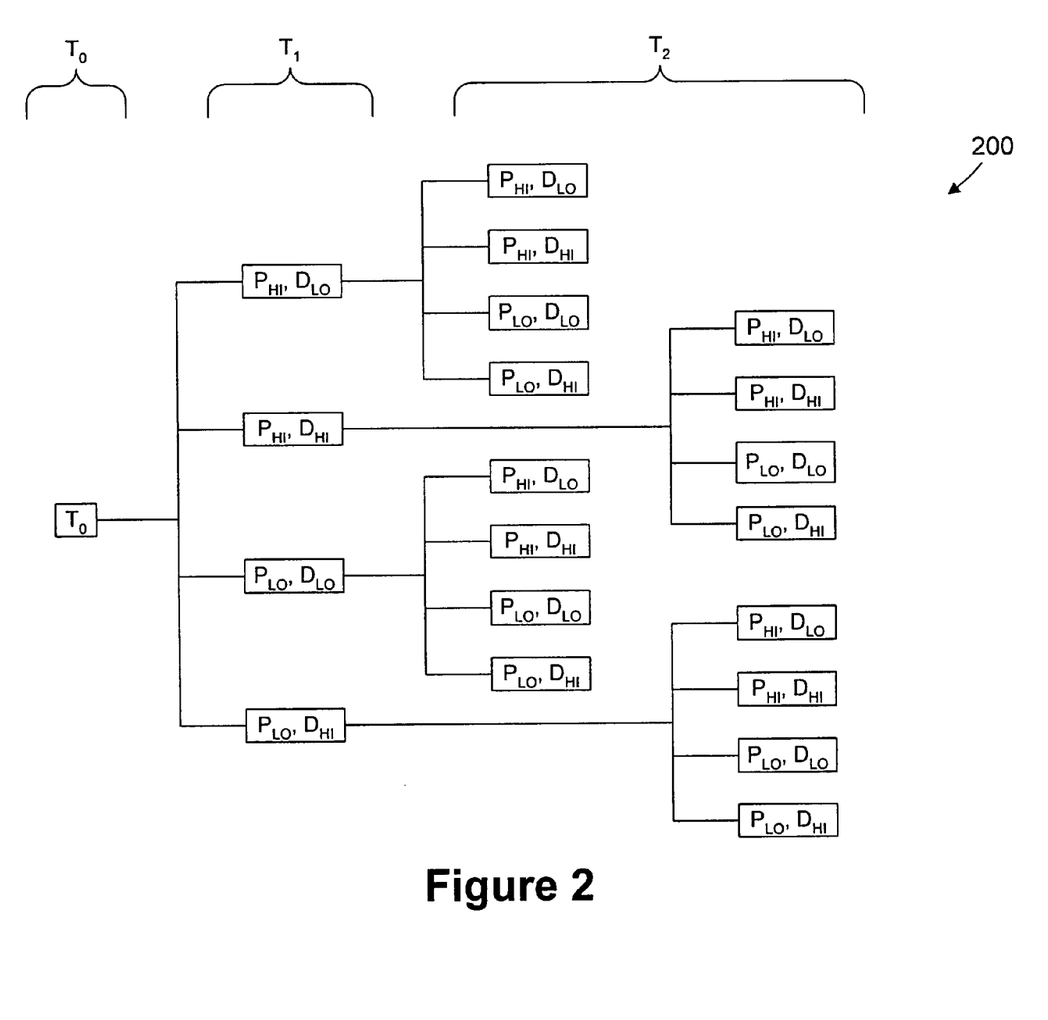
FIG. 2 is a block diagram of an exemplary scenario tree, in accordance with one illustrative embodiment of the present invention.

The demand forecast 130 is used to generate a scenario tree 135 for each product in the product database 101. The scenario tree 135, captures the uncertainty in the demand forecast by using a discrete number of demand levels. Referring now to FIG. 2, one embodiment of the scenario tree 135 is illustrated. FIG. 2 provides an example of a demand uncertainty scenario tree 135 with three time periods ($T_0$, $T_1$, $T_2$), two price classes (subscripts LO, HI) and two demand levels (subscripts LO, HI). The variable "P" represents the price class. P can have a value of $P_{HI}$ and $P_{LO}$. $P_{HI}$ represents a price class for a given product above a price threshold. $P_{LO}$ represents a price class for the product below the price threshold. It is understood that any number of price classes may be used depending on the implementation as is known to those skilled in the art. The variable "D" represents the demand level. D can have a value of $D_{HI}$ and $D_{LO}$. $D_{HI}$ represents a demand above a demand threshold (hereinafter "high demand"). $D_{LO}$ represents the demand below the demand threshold (hereinafter "low demand"). Given a block (P*, $D_{HI}$) and a block (P*, $D_{LO}$) in a given time period, wherein * is a wildcard representing a subscript HI or a subscript LO, block (P*, $D_{HI}$) represents the probability that for the given price class, the demand is a high demand, and block (P*, $D_{LO}$) represents the probability that for the given price class, the demand is a low demand. For a given time period, the sum of the probability for a high demand for a given price class and the probability for a low demand for the given price class is one. For example, the sum of block ($P_{HI}$, $D_{HI}$) and block ($P_{HI}$, $D_{LO}$) in time period $T_1$ is one, and the sum of block ($P_{LO}$, $D_{HI}$) and block ($P_{LO}$, $D_{LO}$) in time period $T_1$ is also one.

In an alternate embodiment of the scenario tree 135, each block may also store a set of decision variables. The set of decision variables may include $q_{it}$ (i.e., quantity of product in price class i to be sold in time period t), $x_{it}$ (i.e., quantity of product in price class i manufactured in time period t to be sold in time period t+1), and $y_{it}$ (i.e., quantity of product in price class i manufactured in time period to be sold in time period t). The set of decision variables are described in greater detail below. Any of a variety of other decision variables may be used, as is contemplated by those skilled in the art. It is understood that any number of demand levels may be used depending on the implementation as is known to those skilled in the art. It is also understood that the price threshold and the demand threshold may be determined by a user and may fluctuate depending on the goals the user would like to achieve.

The scenario tree 135 of FIG. 2 enumerates all possible demand realizations over any given number of time periods (i.e., the planning horizon). Time period $T_0$ represents a planning period where no products are produced and there is theoretically no demand. Time periods $T_1$ and $T_2$ are illustrated in FIG. 2. It is understood that any number of time periods may be generated for the scenario tree 135 depending on the implementation as is known to those skilled in the art. It is also understood that a time period may span any amount of time depending on the implementation as is known to those skilled in the art. For example, a user may choose to span the scenario tree 135 for weekly time periods over a quarterly (i.e., 3-month) planning horizon. For another example, the user may choose to span the scenario tree 135 for monthly time periods over a one year planning horizon. As is easily discernible from viewing FIG. 2, the scenario tree 135 can grow very large given a higher number of time periods, price classes and demand levels.

Referring again to FIG. 1, the scenario tree 135 is used to optimize the inventory allocation 140 for each price class and time period of a given product. As previously mentioned, the scenario tree 135 provides all possible demand realizations over a planning horizon. The possible demand realizations are used in conjunction with the bill-of-material structure table 125 to determine the amount of materials needed (i.e., the inventory allocation 140) to generate a quantity of the given product to meet the possible demand realizations provided by the scenario tree 135. For example, if a computer manufacturer sells two different price classes of computers and a warehouse stores a certain quantity of a processor that is used for both price classes of computers, the inventory allocation 140 provides an allocation of the quantity of processors that should go to the each price class of computers.

The inventory allocation 140 provides the quantity of a particular product for various price classes that need to be produced over a given time period. As a result, the inventory allocation 140 may be extended for multiple time periods to produce an optimized sales plan 145 over the planning horizon for maximizing revenue and profit. A method of generating an optimized sales plan 145 is described in greater detail in FIG. 3. In one embodiment, the optimized sales plan 145 may generate the values of $q_{it}$, $x_{it}$, and $y_{it}$, as described above and in greater detail below. Thus, as illustrated in FIG. 1, the values of $q_{it}$, $x_{it}$, and $y_{it}$, generated by the sales plan are passed to the scenario tree 135 for updating the values in the blocks.

Once the optimized sales plan 145 has been generated, the sales plan 145 may be reoptimized in accordance with real-world sales data. The real-world sales data are collected by an order realization module 150. The order realization module 150 collects real-world order data realized across multiple channels. As previously mentioned, the channels include, but are not limited to, acquiring directly from consumers (e.g., through a manufacturer's website), indirectly from consumers (e.g., through a point-of-sale terminal at a retail store), or from another business (e.g., through a reverse auction). The order data is collected by the trigger engine 155, which estimates proper demand realizations and determines whether it is necessary to update or regenerate the scenario tree 135. The operation of the trigger engine 155 is described in greater detail in FIG. 5. If it is necessary, the optimized sales plan 145 is reoptimized using the real-world sales data collected by the order realization module 150. The values of $q_{it}$, $x_{it}$, and $y_{it}$, are also updated in the scenario tree 135. The estimates of the proper demand realizations may be used to eliminate certain paths of the scenario tree 135. The trigger engine 155 may be executed one or more times in each stage. Once all the stages have been completed, the trigger engine 155 ends.

Figure 3:
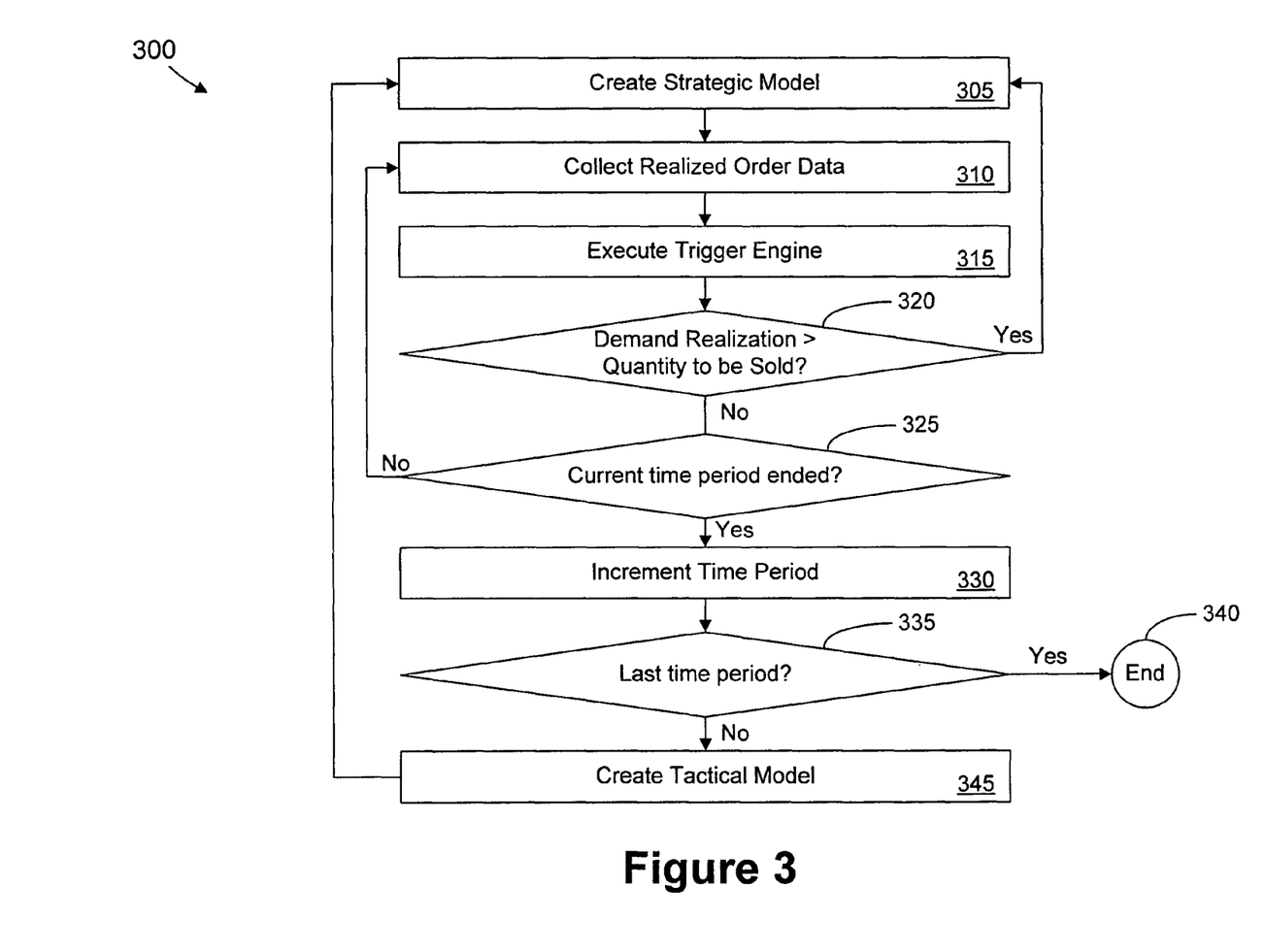
FIG. 3 is a flow diagram of a sales planning method, in accordance with one illustrative embodiment of the present invention.
Figure 4:
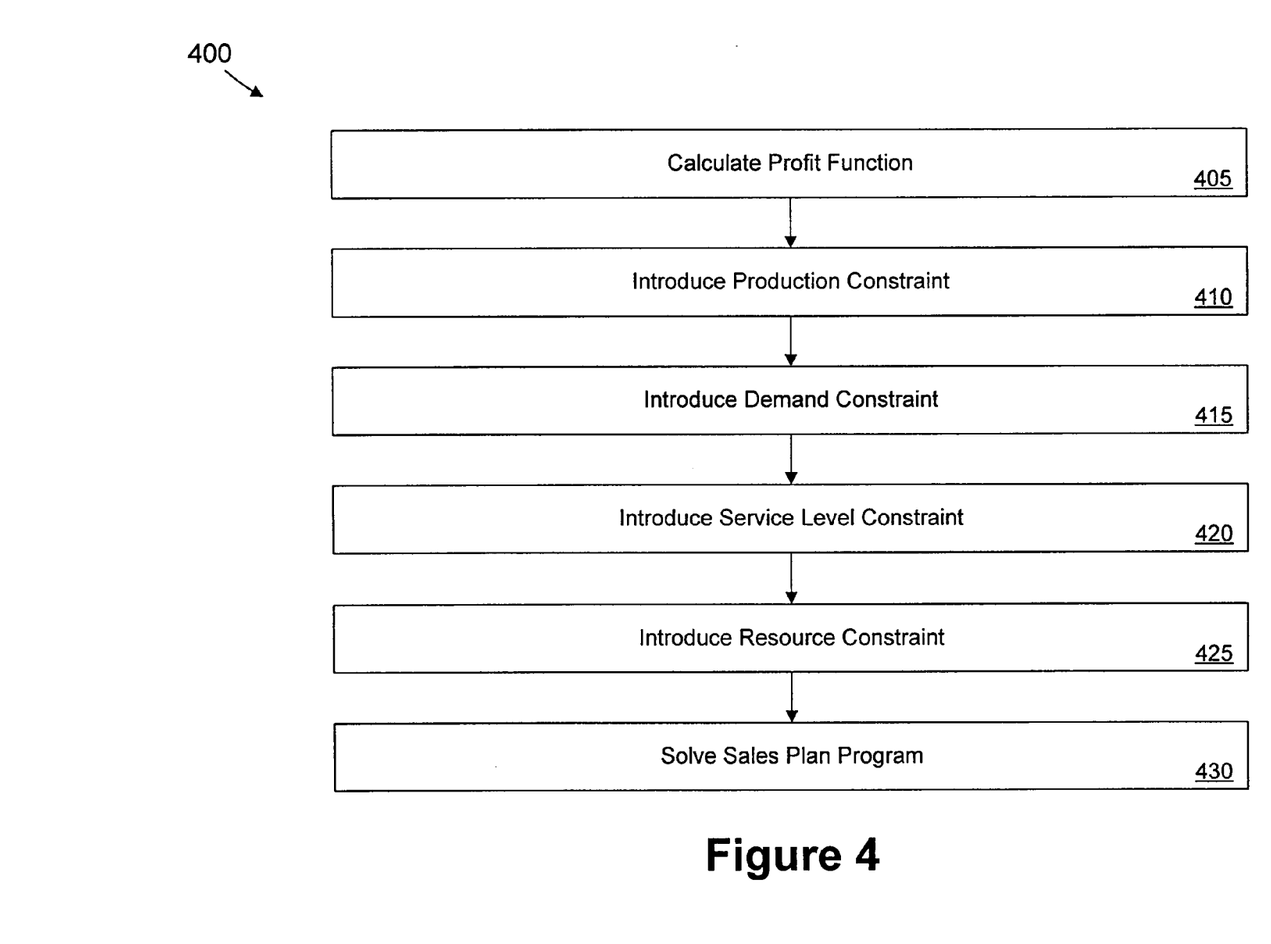
FIG. 4 is a flow diagram of a method for creating a strategic model, in accordance with one illustrative embodiment of the present invention.

Referring now to FIG. 3, a method 300 of sales planning, in accordance with one embodiment of the present invention, is illustrated. The method 300 is executed at the beginning of a time period. A strategic model is created (at 305). Referring now to FIG. 4, a method 400 of creating the strategic model, which creates the optimized sales plan 145 of FIG. 1, in accordance with one embodiment of the present invention, is illustrated. A profit function is calculated (at 405) that accounts for the total profit based on the quantity of each product sold. The profit function, for example, may be revenue from each price class minus the cost for each price class. The revenue may be calculated by multiplying the price point for a product by the quantity of the product that is expected to sell for each price class.

A series of constraints are introduced. The constraints provide limitations provide guidelines for creating the optimized sales plan 145. It is understood that the present invention is not limited to the constraints provided herein. These and other constraints may be used depending on the implementation as is known to those skilled in the art. A production constraint is introduced (at 410) which guarantees the total quantity of a product sold is no more than the quantity of the product produced. A demand constraint is introduced (at 415) which guarantees that the total quantity of a product sold for a given price class and time period is less than or equal to the demand realized for that period. A service level constraint is introduced (at 420) which ensures that at least a certain fraction of the demand of a product for a given price class and time period is satisfied in accordance with a service level agreement ("SLA"). A "SLA," as used in the present invention, refers to an agreement between two parties (i.e., a business or a consumer) specifying what services are provided and the quantity and/or quality of the services provided. It is understood that the SLA may provide for any of a variety of services, as is contemplated by those skilled in the art. For example, in the illustrated embodiment of FIG. 4, the SLA provides that a minimum demand of a product for a given price class and time period must be satisfied. It is further understood that in an alternate embodiment, an SLA may not exist.

Referring again to FIG. 4, a resource constraint is introduced (at 425) which ensures that the total quantity of resources used to produce a product is not more than the inventory of the resources on hand. A sales plan program is solved (at 430) preferably using a stochastic programming solver, which outputs the optimized sales plan 145 of FIG. 1. In one embodiment, the sales plan provides Stochastic programming supports decision making under uncertainty. It is a methodology for bringing uncertain future scenarios into the traditional decision making framework of linear programming. Just as linear programming models the optimal allocation of constrained resources to meet known demands, stochastic programming models the allocation of current resources to meet unknown future demands in such a way that a user can explore the tradeoffs with respect to expected risks and rewards and make informed decisions. IBM OSL (Optimization Solutions and Library) Stochastic Extensions provide a set of resources for modeling multistage stochastic programs. Other methods known to those skilled in the art are also contemplated and can be used, including stochastic and non-stochastic programming models.

Referring again to FIG. 3, realized order data is collected (at 310). Any of a variety of techniques for collecting realized order data may be used, as is known to those skilled in the art. In one embodiment, a realized order data counter (not shown), which is initially set to zero at the beginning of the time period, may increment each time new realized order data is collected (at 310). It is understood that the frequency by which realized order data is collected may vary depending on implementation, as is known to those skilled in the art.

Figure 5:
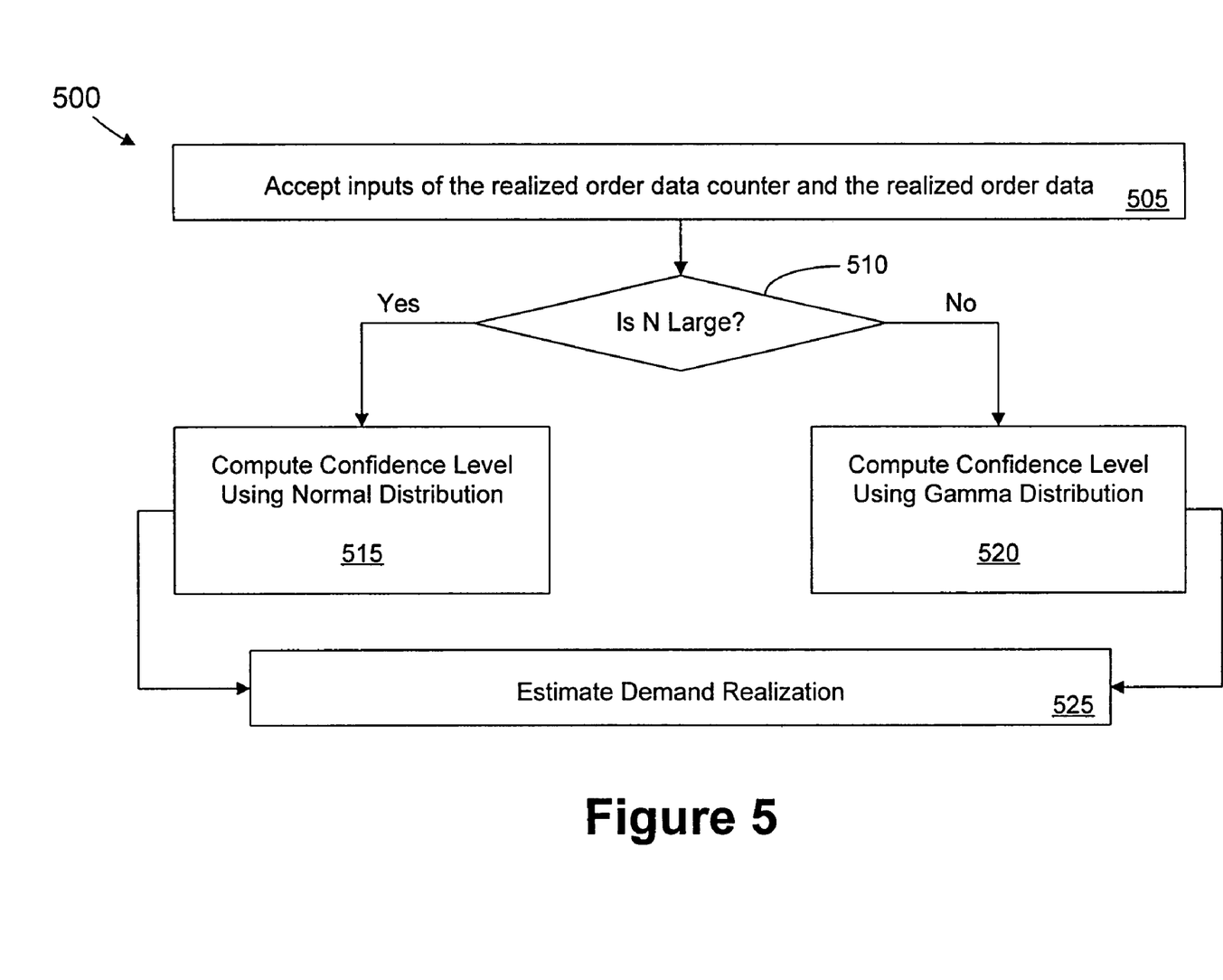
FIG. 5 is a flow diagram of a method for collecting realized order data, in accordance with one illustrative embodiment of the present invention.

A trigger engine is executed (at 315). Using the realized order data collected (at 310), the trigger engine continuously estimates the demand for a product that is being realized in the current time period with a confidence interval. Referring now to FIG. 5, a flow diagram 500 illustrating the operation of the trigger engine, in accordance with one embodiment of the present invention, is provided. The trigger engine accepts (at 505) inputs of the realized order data counter and the realized order data. The trigger engine determines (at 510) whether the realized order data counter is "large." For example, a realized order data counter of 20 may be considered "large." The value of a "large" realized order data counter may vary depending upon implementation, as is known to those skilled in the art. Furthermore, in alternate embodiments, the conditional determining whether a trigger engine is "large" may be eliminated from the method or some other conditional may be used.

If the realized order data counter is "large," then a confidence interval a can be determined (at 515) using a normal distribution equation as follows:

$$\langle \hat{T} \rangle = \left( \hat{T} - k_{a/2} \frac{S_T}{\sqrt{N_t}}; \hat{T} + k_{a/2} \frac{S_T}{\sqrt{N_t}} \right)$$

If the realized order data counter is not "large," then the confidence level can be determined (at 520) using a gamma distribution equation as follows:

$$f_{\lambda,\nu}(x) = \sum_{i=1}^{N} f_{\lambda,1}$$

The confidence level $\alpha$ for $\langle \hat{T} \rangle = (F_\alpha, F_{1-\alpha})$ where $F_\alpha$ is the solution to $$a = \int_0^{F_a} \frac{1}{\Gamma(N)} \lambda^N \left(\frac{x}{N}\right)^{N-1} e^{\lambda(\frac{x}{N})}$$

and ($F_\alpha$, $F_{1-\alpha}$) represents a confidence interval. The variable N represents the number of observations of realized demand. In the present embodiment, the variable N is determined using a realized order data counter. However, it is understood that any method known to one skilled in the art may be used to collect the number of observations of realized demand. Once the confidence level $\alpha$ is calculated, then one can estimate the confidence interval ($F_\alpha$, $F_{1-\alpha}$). The confidence interval ($F_\alpha$, $F_{1-\alpha}$) provides a lower bound of demand (i.e., $F_\alpha$) and an upper bound of demand (i.e., $F_{1-\alpha}$). The confidence level $\alpha$ represents a probability that the realized demand will be outside the range of the confidence interval ($F_\alpha$, $F_{1-\alpha}$). The value of an inverse confidence level, 1-$\alpha$, represents a probability that that the realized demand is inside the range of the confidence interval ($F_\alpha$, $F_{1-\alpha}$). For example, by performing the calculations above, for an estimated mean demand of 100, if $\alpha$=0.05, then there is a 5% chance that the realized mean demand lies outside the range between 95 and 105 (i.e., the calculated confidence interval is (95, 105)). Similarly, for an estimated mean demand of 100, for $\alpha$=0.10, the confidence interval is (98, 102), for $\alpha$=0.25, the confidence interval is (99, 101), and etc. In the aforementioned examples, the number of observations of realized demand was fixed at 20 (i.e., N=20). Now, given a fixed $\alpha$=0.05, if there are ten observations of realized demand (i.e., N=10) and the estimated mean demand is 100, there is a 5% chance that the realized mean demand lies outside the range between 93 and 107 (i.e., the calculated confidence interval is (93, 107)). Similarly, for an estimated mean demand of 100, for N=20, the confidence interval is (95, 105), for N=50, the confidence interval is (98, 102), and etc.

In one embodiment, once the confidence level $\alpha$ or the inverse confidence level (1-$\alpha$) reaches a certain threshold, then the demand realization is estimated (at 525) (i.e., demand at price class i is estimated). In the illustrated embodiment provided in FIG. 2, for the price class i, demand is either high or low. It is understood that the description of the confidence level as described above is only illustrative and should not be construed as limiting the present invention. Other embodiments of the confidence level may be contemplated by those skilled in the art.

Referring again to FIG. 3, it is determined (at 320) that for that given time period and price class, whether the estimated demand realization for a product exceeds the quantity of the product to be sold, $q_{it}$. If the demand for the product exceeds the quantity of the product to be sold, $q_{it}$, then the strategic model must be recreated (at 305). By recreating (at 305) the strategic model, manufacturing for the product, $x_{it}$, may be increased, for example, to satisfy the increased estimated demand realization. Other business decisions may be contemplated, as is known to those skilled in the art.

Furthermore, in one embodiment, by estimating (at 525 of FIG. 5) the demand realization for all price classes of a product, certain paths of the scenario tree 200 of FIG. 2 may be eliminated. Referring again to FIG. 2, for example, if it is known that for both price class high and price class low that the demand is high, then blocks ($P_{HI}$, $D_{LO}$) and ($P_{LO}$, $D_{LO}$) and all subsequent blocks in subsequent time periods can be eliminated as well. By eliminating certain paths of the scenario tree 200, accuracy of the optimized sales plan 145 of FIG. 1 is improved.

Referring again to FIG. 3, if the demand for the product does not exceed the quantity of the product to be sold, $q_{it}$, then the amount manufactured, $x_{it}$, is enough to cover the demand. As a result, no more quantity of the product needs to be produced. It is determined (at 325) whether the current time period has ended. If the current time period has not ended, the more realized order data is collected (at 310). If the current time period has ended (at 325), then the current time period is incremented (at 330) to the next time period. If it is determined (at 335) that the next time period is the last time period (i.e., the end of the planning horizon has been reached), then the method 300 ends (at 340). If it is determined (at 335) that the next time period is not the last time period, then the method 300 continues and a tactical model is created (at 345).

Figure 6:
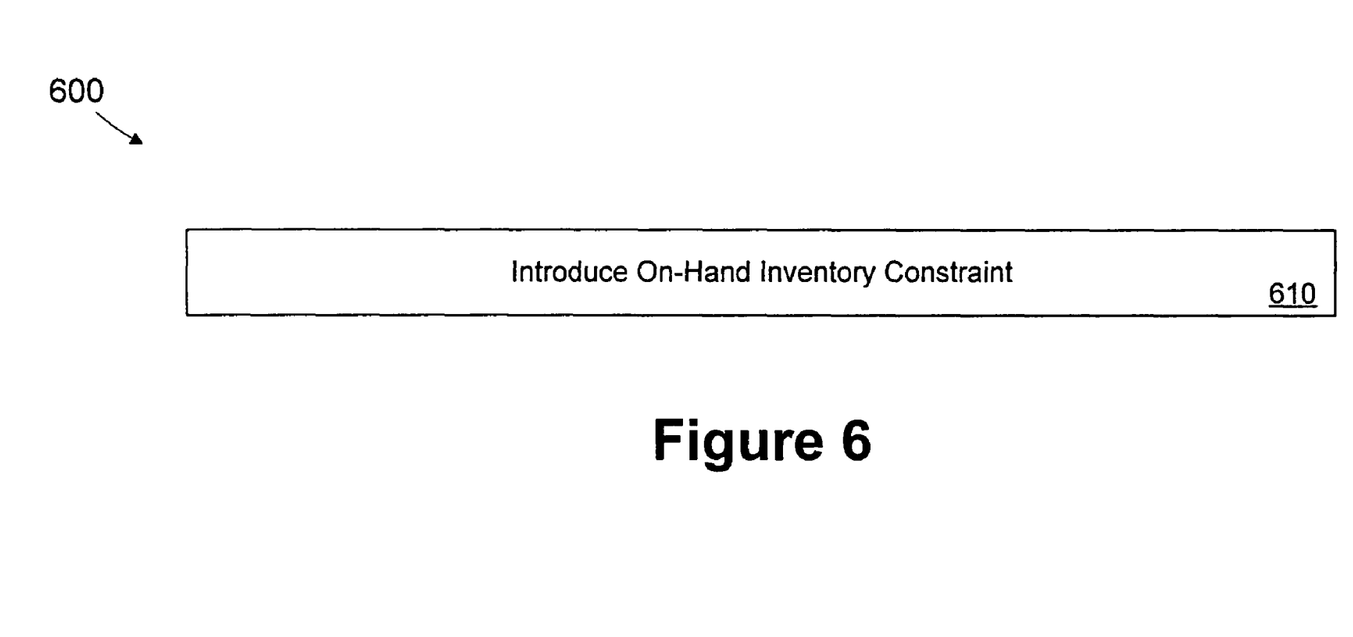
FIG. 6 is a flow diagram of a method for creating a tactical model, in accordance with one illustrative embodiment of the present invention.

Referring now to FIG. 6, a method 600 of creating the tactical model, in accordance with one embodiment of the present invention is illustrated. The tactical model is generally an extension of the strategic model illustrated in FIG. 4. The tactical model introduces an additional constraint to the strategic model. An on-hand inventory constraint is introduced (at 610). The on-hand inventory constraint provides the value, $x_{it}$, to the strategic model. As previously mentioned, a novelty of the present invention is that the goods are nonperishable. The value, $x_{it}$, represents the quantity of a product manufactured in a particular price class that was not sold in the current time period. As a result, the product will be sold in the next time period as the strategic model is recreated (at 315).

Consistent with FIGS. 1-6, as described above, provided below are alternate representations of the strategic model, the tactical model, and the trigger engine, in accordance with one embodiment of the present invention. First, the parameters and variables associated with the models are described.

Parameters and Variables

I=the set of price classes={1, 2, . . . , |I|};

J(i)=the set of products per price class i={1, 2, . . . , |J(i)|};

K=the set of resources consumed in manufacturing the products={1, 2, . . . , |K|};

T=the set of time periods={1, 2, . . . , |T|};

$p_{it}$=the price point for the price class i in time period t;

$c_{it}$=the penalty (i.e., cost) incurred in producing a unit of product in price class i, i$\in$I in the time period t to be sold in the time period t;

$d_{it}$=the demand for products in price class i in time period t;

$r_k$=the quantity of resource k available for the planning horizon;

$SLA_i$=the service level agreement for price class (i.e., % demand that must be met);

$z_{jt}$=quantity of product j to be sold at time t;

$q_{it}$=quantity of products in price class i to be sold at time t=$\Sigma_{j \in J(i)} z_{jt}$;

$x_{it}$=quantity of products in price class i manufactured in period t to be sold in period t+1, t$\in$\{1, 2, . . . , |T|-1\};

$y_{it}$=quantity of products in price class i, i$\in$I, to be produced in time period t to be sold in time period t The following are assumed during the development of the models:

(1) There is one product in each price class, i.e., This implies that both variables $z_{jt}(\alpha_{jk})$ and $q_{it}(\alpha_{ik})$ mean one and the same thing.

(2) Prices for a given class I can vary as a function of time.

(3) Resources are recovered from any unsold products almost immediately.

(4) All uncertainties are in time periods t=2, 3, . . . .

The Strategic Model

It is assumed that there is no selling in the first time period (i.e., $T_0$). There is an outlook (in the form of a scenario tree) for the future uncertain demands for products in different price classes. Based on this outlook, a strategic plan is developed on how much to produce and sell in each time period to maximize expected returns.

$$\max \sum_{t \in T} \sum_{i \in I} p_{it} \cdot q_{it} - \sum_{t \in T} \sum_{i \in I} c_{it} \cdot y_{it}$$

$$x_{it} + y_{i,t+1} \geq q_{i,t+1}, \forall i \in I, t \in \{1, 2, \ldots, |T|-1\}$$

$$SLA_i \cdot d_{i,t+1} \leq q_{i,t+1}, \forall i \in I, t \in \{1, 2, 3, \ldots, |t|-1\}$$

$$\sum_{t \in T} \sum_{i \in I} a_{ik} \cdot q_{it} \leq r_k, \forall k \in K$$

$$q_{it}, x_{it}, y_{it} \geq 0, \forall i \in I, t \in \{1, 2, \ldots, |T|\}$$

The Tactical Model

At the tactical level, it is assumed that there is on-hand inventory. The demand scenario for the current time period is realized. Then the sales plan is reoptimized to exploit all the knowledge available until the current time period ends. If the current demand exceeds the planned sales volume, then the tactical decision involves reevaluating the sales plan by hedging against the uncertainties in future demands and recommending whether or not to accept the incumbent bid for additional sales.

A new parameter and variable is introduced:
$\bar{x}_{i0}$=quantity of products in price class i, i∈I, available on-hand (carried over from the previous time period) in the current time period to be sold in the next time period 1, t∈{1, 2, ..., |T|−1};

The problem formulation for the tactical model then becomes:

$$R^* = \max R = \sum_{t \in T} \sum_{i \in I} p_{it} \cdot q_{it} - \sum_{t \in T} \sum_{i \in I} c_{it} \cdot y_{it}$$

$$x_{i,t-1} + y_{it} \geq q_{it}, \forall i \in I, t \in \{1, 2, \ldots, |T|\}$$

$$SLA_i \cdot d_{it} \leq q_{it} \leq d_{it}, \forall i \in I, t \in \{1, 2, \ldots, |T|\}$$

$$\sum_{t \in T} \sum_{i \in I} a_{ik} \cdot q_{it} \leq r_k, \forall k \in K$$

$$x_{i0} = \bar{x}_{i0}, \forall i \in I$$

$$q_{it}, x_{it}, y_{it} \geq 0, \forall i = I, t \in \{1, 2, \ldots, |T|\}$$

By resolving the above, a revised sales plan is obtained for current and future sales volumes (by scenarios) and the resulting solution provides economic indicators of accepting bids for additional orders beyond the planned sales volume. Of particular interest here is evaluating R* when demand for product in price class i for time period 1, $d_{i1}$, changes to $d_{i1}+1$. This determines whether there is an economic incentive to sell an additional unit of product in price class i in the current period without negatively affecting future service level requirements and profitabilities.

When the tactical problem is solved to optimality by a simplex based algorithm, a row dual price may provide some perspective on such economic indicators. The row dual price is a mathematical way of pricing the marginal cost of using an extra unit of resource. But this perspective is very myopic as the computation of the row dual price does not guarantee whether an integral increment of the row bounds is allowable. Therefore, it may be necessary to evaluate the desired partial derivative such that $\partial R^*/\partial d_{i1}|_{d_{i1}}^*$ such that $q_{i1}+1$ is feasible in the tactical model when $d_{i1}^* = d_{i1}+1$.

Trigger Engine

Within a time period it is assumed that demand arrives as a random process for each price class. The key question is how identifying the demand state (e.g., high or low demand) is useful in making reallocation decisions. Notice that in the strategic model above it was assumed for each price class i the demand $d_{it}^{lo}$ with probability $p_{lo,t}$ and $d_{it}^{hi}$ with $p_{t,hi}$. For any price class, it is assumed that the demand arrive is a Poisson process having a rate of $\lambda_t$.

$$P\{N(t+T) - N(t) = n\} = e^{-\lambda \times T} \frac{(\lambda \times T)^n}{n!}, n = 0, 1, 2, 3$$

The expected number of events in an interval T is $E[N(T)] = \lambda_t \times T$. Therefore if the demand in the interval is low, then the rate of the process should be $$\lambda_t^{lo} = \frac{d_{it}^{lo}}{T},$$

else it should be $$\lambda_t^{hi} = \frac{d_{it}^{hi}}{T}.$$

Consider a Poisson process with the rate of $\lambda_t$. Let the sequence $T_n$, n=1, 2, 3 . . . denote the interarrival times between successive events. For a Poisson process it is known that $T_n$ is independent, identically distributed exponential distribution with a mean $$\frac{1}{\lambda_t}.$$

Now, any of a variety of classical approaches from statistics known to those skilled in the art may be used to estimate $\lambda_t$.

In any time period T, the sequence can be treated as independent and identically distributed (exponentially) and the mean can be estimated from this sample as follows:

$$\hat{T} = \frac{\sum_{n=1,\ldots,N_t} T_n}{N_t} = \frac{1}{\lambda_t}; S_T^2 = \frac{\sum_{n=1,\ldots,N_t} (T_n - \hat{T})}{N}$$

Assuming that $N_t$ is large enough, the confidence interval for $\hat{T}$ can be estimated using the following:

$$\langle \hat{T} \rangle = \left( \hat{T} - k_{\alpha/2} \frac{s_T}{\sqrt{N_t}}; \hat{T} + k_{\alpha/2} \frac{s_T}{\sqrt{N_t}} \right)$$

where (1-α) is the specified confidence level. However, for the low demand case, the number of events might not be large enough to justify using the above approximation and needs to be established using an exact interval. This is done by noting that sums of exponential distributions give a gamma distribution. The gamma distribution is given by the following:

$$f_{\lambda,\nu}(x) = \frac{1}{\Gamma(\nu)} \lambda^\nu x^\nu e^{\lambda x}$$

Notice that $\nu=1$ yields the exponential distribution. Sums of gamma distributions yield the following gamma distribution:

$$f_{\lambda,\nu}(x) = \sum_{i=1}^{N} f_{\lambda,1}$$

The $\alpha$ confidence level for $<\hat{T}>=(F_\alpha, F_{1-\alpha})$ where $F_\alpha$ is the solution to $$a = \int_0^{F_a} \frac{1}{\Gamma(N)} \lambda^N \left(\frac{x}{N}\right)^{N-1} e^{\lambda(\frac{x}{N})}.$$

The trigger engine can now be designed using the confidence interval. As the number of events observed $N_t$ increase, the confidence interval keeps narrowing. Initially it is presumably large enough to include both the low and high demand scenarios. As the intervals narrow sufficiently to exclude one of the scenarios, the demand scenario can be deduced.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A non-transitory machine-readable medium having instructions stored thereon for execution by a processor to perform a method of developing an optimal sales plan for multiple products with multiple price classes contingent on different possible realizations of uncertain demand over multiple time periods with the objective of maximizing expected revenue over a constrained capacity, the method comprising:

determining a strategic model by the processor having an allocation of each of the multiple products across the multiple price classes to be sold in each of the multiple time periods;

estimating a likelihood by the processor that the demand for each of the multiple products exceeds the allocation at the price class for each of the multiple time periods;

collecting realized order data by a trigger engine using the processor for the multiple products at each of the multiple price classes and for each of the multiple time periods;

re-determining a sales plan by a tactical decision model using the processor based on the likelihood and the realized order data at each of the multiple price classes and for each of the multiple products within a current time period upon determining that the demand for the at least one of the multiple time periods exceeds the allocation for the given product at the price class; and determining an economic indicator using the tactical decision model and the processor based on the re-determined sales plan to accept an order for a given product of the multiple products upon determining that the demand exceeds the allocation for the given product at a price class in at least one of the multiple time periods.

2. The machine-readable medium of claim 1, wherein collecting realized order data comprises continuously collecting new realized order data and using the likelihood and the new realized order data to generate a revised sales plan.

3. The machine-readable medium of claim 1, further comprising formulating a multistage stochastic program comprises formulating the multistage stochastic program using IBM OSL Stochastic Extensions.

4. The machine-readable medium of claim 1, further comprising formulating a multistage stochastic program that generates a quantity of each product to be sold in each of the multiple time periods and a recommendation comprises formulating a multistage stochastic program that generates a quantity of each product to be sold in each of the multiple time periods and a recommendation for pricing each of the multiple products.

5. The machine-readable medium of claim 1, wherein estimating the likelihood comprises determining a demand forecast and comparing the demand forecast and the planned sales volume.

6. The machine-readable medium of claim 1, further comprises executing a multistage stochastic program using the likelihood to generate a sales plan for pricing each of the multiple products.

7. The machine-readable medium of claim 1, wherein collecting realized order data comprises collecting realized order data from an Internet website.

8. The machine-readable medium of claim 1, wherein collecting realized order data comprises collecting realized order data from a point-of-sale terminal.

9. The machine-readable medium of claim 1, wherein collecting realized order data comprises collecting realized order data from a reverse auction.

10. The machine-readable medium of claim 1, further comprising keeping a counter of the quantity of realized order data being collected.

11. The machine-readable medium of claim 1, further comprising calculating a confidence level representing a probability that the realized order data will be outside the range of a confidence interval.

12. The machine-readable medium of claim 1, wherein the confidence level is calculated using a normal distribution program upon determining that the counter has a value above a threshold.

13. The machine-readable medium of claim 1, wherein the confidence level is calculated using a gamma distribution program upon determining that the counter has a value below a threshold.

14. An apparatus for developing an optimal sales plan for multiple products with multiple price classes contingent on different possible realizations of uncertain demand over multiple time periods with the objective of maximizing expected revenue over a constrained capacity, the apparatus comprising:

a processor;

a memory;

a stochastic programming engine for formulating and executing a multistage stochastic program that generates (i) a strategic decision model for prescribing a sales plan indicating a quantity of each product to be sold in each of the multiple time periods, and (ii) a tactical decision model for generating an economic indicator to accept an order for at least one of the multiple products according to the sales plan and on-hand inventory at a time when demand exceeds a planned sales volume for at least one of the multiple time periods; and a trigger engine collecting realized order data and determining that a demand scenario is realized for the at least one of the multiple products for a given time period and providing an indication of when to re-determine the sales plan upon determining that the demand scenario for the at least one of the multiple products for the given time period exceeds the planned sales volume, wherein the sales plan is re-determined according to the indication of the trigger engine and the re-determined sales plan is used by the tactical decision model for generating the economic indicator and for determining a supply of the multiple products in the multiple price classes.

15. The apparatus of claim 14, wherein the trigger engine comprises a set of decision variables.

16. The apparatus of claim 15, wherein the set of decision variables comprising:

a variable indicating the planned sales volume of one of the multiple products in one of the multiple price classes;

a variable indicating the quantity of one of the multiple products in one of the multiple price classes manufactured in a current time period to be sold in a next time period; and a variable indicating the quantity of one of the multiple products in one of the multiple price classes manufactured in the current time period to be sold in the current time period.

17. The apparatus of claim 14, wherein the strategic decision model comprises:

a profit function that accounts for total revenue for each of multiple products, wherein the profit function comprises:

a production constraint;

a demand constraint; and a service level constraint.

18. The apparatus of claim 17, wherein the profit function further comprises an on-hand inventory constraint.

* * * * *

UNITED STATES PATENT AND TRADEMARK OFFICE
CERTIFICATE OF CORRECTION

| | | |
|---|---|---|
| PATENT NO. | : 7,774,226 B2 | |
| APPLICATION NO. | : 10/664842 | |
| DATED | : August 10, 2010 | |
| INVENTOR(S) | : Jayant R. Kalagnanam, Monalisa Mohanty and Gyana Ranjan Parija | |

It is certified that error appears in the above-identified patent and that said Letters Patent is hereby corrected as shown below:

Title Page, Item (75) Inventors:

Inventor "Jayant R. Kalagnanm" should appear as --Jayant R. Kalagnanam--.

Signed and Sealed this

Twenty-second Day of February, 2011

David J. Kappos
*Director of the United States Patent and Trademark Office*